(12) United States Patent
Kwon et al.

(10) Patent No.: US 11,890,616 B2
(45) Date of Patent: Feb. 6, 2024

(54) MICROFLUIDIC DEVICE FOR CAPTURE OF MICROMETER SCALE OBJECTS AND METHODS OF USING THE DEVICE

(71) Applicant: THE CURATORS OF THE UNIVERSITY OF MISSOURI, Columbia, MO (US)

(72) Inventors: Jae Wan Kwon, Columbia, MO (US); Jussuf Kaifi, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 696 days.

(21) Appl. No.: 16/830,617

(22) Filed: Mar. 26, 2020

(65) Prior Publication Data

US 2020/0306759 A1    Oct. 1, 2020

Related U.S. Application Data

(60) Provisional application No. 62/823,771, filed on Mar. 26, 2019.

(51) Int. Cl.
*B01L 3/00* (2006.01)
*G01N 15/10* (2006.01)

(52) U.S. Cl.
CPC .... *B01L 3/502761* (2013.01); *G01N 15/1056* (2013.01); *B01L 2200/0636* (2013.01); *B01L 2200/0647* (2013.01); *B01L 2200/0652* (2013.01); *B01L 2200/0668* (2013.01);
(Continued)

(58) Field of Classification Search
CPC ....... B01L 3/502761; B01L 2200/0636; B01L 2200/02647; B01L 2200/0652; B01L 2300/0864; B01L 2400/086; G01N 15/1056
See application file for complete search history.

(56) References Cited

U.S. PATENT DOCUMENTS

| | | |
|---|---|---|
| 7,381,361 B2 | 6/2008 | Sundararajan |
| 8,304,230 B2 | 11/2012 | Toner et al. |
| 8,951,484 B2 | 2/2015 | Bersano-Begey et al. |

(Continued)

FOREIGN PATENT DOCUMENTS

WO    WO-2019079399 A1 *    4/2019    ........ B01L 3/502746

OTHER PUBLICATIONS

Banko, et al., "Technologies for circulating tumor cell separation from whole blood", Journal of Hematology & Oncology, 2019, 12:48 (20 pgs).

(Continued)

*Primary Examiner* — Jill A Warden
*Assistant Examiner* — Alex Ramirez
(74) *Attorney, Agent, or Firm* — Sandberg Phoenix & von Gontard PC

(57) ABSTRACT

The subject matter described herein relates to devices and methods for capturing micrometer scale objects from a fluid flow, and more particularly, to devices and methods for capturing cells. The devices generally comprise an array of posts configured and arranged to selectively direct the micrometer scale objects toward trapping channels defined between posts in which the micrometer scale objects can be trapped, and to direct smaller particles through bypass channels around the posts. Methods for using the devices to trap cells, analyze cells and treat cancer are also described.

15 Claims, 14 Drawing Sheets

(52) U.S. Cl.
CPC .......... *B01L 2300/0861* (2013.01); *B01L 2300/0864* (2013.01); *B01L 2400/086* (2013.01)

(56) References Cited

U.S. PATENT DOCUMENTS

| | | | |
|---|---|---|---|
| 9,458,489 B2 | 10/2016 | Lim et al. | |
| 9,823,238 B2 | 11/2017 | Rao et al. | |
| 10,022,659 B2 | 7/2018 | Nakanishi et al. | |
| 10,144,009 B2 | 12/2018 | Bhagat et al. | |
| 10,232,371 B2 | 3/2019 | Collins | |
| 10,444,233 B2 | 10/2019 | Tseng et al. | |
| 10,564,077 B2 | 2/2020 | Beebe et al. | |
| 2012/0261356 A1* | 10/2012 | Tsutsui | B01L 3/502761 210/335 |
| 2014/0227777 A1* | 8/2014 | Choi | G01N 1/34 435/309.1 |
| 2015/0226741 A1 | 8/2015 | Liu | |
| 2015/0362413 A1 | 12/2015 | Zhang et al. | |
| 2016/0122704 A1 | 5/2016 | Bobek et al. | |
| 2018/0258378 A1 | 9/2018 | Shi et al. | |
| 2020/0009563 A1 | 1/2020 | Liu | |
| 2021/0114029 A1* | 4/2021 | Yellen | C12M 23/16 |

OTHER PUBLICATIONS

Kim, et al., "Role of interface shape on the laminar flow through an array of superhydrophobic pillars", Microfluid Nanofluid (2017) 21:78 (12 pgs).

Xiao, et al., "PDMS micropillar-based microchip for efficient cancer cell capture", RSC Advances, Issue 64, 2015 (6 pgs).

Toh et al., "A microfluidic 3D hepatocyte chip for drug toxicity testing", Lab on a Chip, Issue 14, 2009 (11 pgs).

Casavant et al., "Verifast: An Integrated System for Flexible CTC Isolation and Analysis", 1th International Conference on Miniaturized Systems for Chemistry and Life Sciences, Oct. 28-Nov. 1, 2012, Okinawa, Japan (3 pgs).

Web Site Information for "MetaCell, Personalized Cancer Therapy Using Circulating Tumor Cells (CTCs)", BioVender R&D, downloaded from the internet on Dec. 11, 2020 at https://www.biovendor.com/liquid-biopsy?utm_source=google& utm_medium=organic.

Brochure for "The DEPArray™ System", Menarini Silicon Biosystems, Apr. 20, 2020 (3 pgs).

Chen et al., "Clinical Applications of NanoVelcro Rare-Cell Assays for Detection and Characterization of Circulating Tumor Cells", Theranostics, 2016; 6(9): 1425-1439 (25 pgs).

Andree et al., "Challenges in Circulating Tumor Cell Detection by the CellSearch System", Molecular Oncology, Mar. 2016; 10(3): 395-407 (22 pgs).

Wang et al., "Promise and Limits of the CellSearch R Platform for Evaluating Pharmacodynamics in Circulating Tumor Cells (CTC)", Semin Oncol Aug. 2016: 43(4): 464-475 (27 pgs).

Xiao et al., "PDMS Micropillar-Based Microchip for Efficient Cancer Cell Capture", RSC Adv. 2015, 5, 52161-52166 (6 pgs).

Product Sheet, "ISET Technology", Highly Sensitive & Diagnostic Detection of Circulating Tumor Cells, Rarecells Diagnostics, 2018 (6 pgs).

* cited by examiner

MICROFLUIDIC DEVICE FOR CAPTURE OF MICROMETER SCALE OBJECTS AND METHODS OF USING THE DEVICE

CROSS-REFERENCE TO RELATED APPLICATIONS

This application is based on and claims priority to U.S. Provisional Application Ser. No. 62/823,771, filed on Mar. 26, 2019, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

The ability to capture microparticles from a fluid flow enables many applications for the use and study of the captured microparticles. For example, capture of cells (e.g. cancer cells) facilitates academic and medicinal research and treatments. Important considerations for the capture methods include selectivity, specificity, sensitivity, and processing time, among other concerns. Various methods for microparticle capture require chemical labelling of the microparticle to be captured, but such methods can be costly, and can be unsuitable for study of native systems.

Some platforms for label-free separation of microparticles utilize intrinsic electrical and physical biomarkers, including size. The separation techniques can be classified into active and passive methods based on the actuation and control mechanism. For active separation methods, externally induced forces are used for particle separation. Although active methods can offer high resolution separation, a unique physical property of the particle is always required. For example, only electrically charged particles will be affected with electrophoresis. Ultimately, active separation methods typically require high power consumption and are limited to use in specific scenarios. Passive separation methods may offer an alternative, but most efforts reported so far have very low throughput (<20 uL/min), are prone to blockage issues, or have poor capture efficiency.

BRIEF SUMMARY OF THE INVENTION

Aspects of this disclosure enable a device for capturing micrometer scale objects. In one aspect, a device includes a chamber comprising an inlet for receiving a fluid flow, wherein the fluid comprises one or more micrometer scale objects to be captured. A plurality of posts extends from a base of the chamber and are arranged in pairs in an array. The posts comprise a trapping section and a bypass section. The device also includes a plurality of trapping channels defined between the trapping sections of the posts comprising the pairs, wherein the trapping channels have a width narrower than a diameter of the micrometer scale objects to be captured. The device further includes a plurality of bypass channels partially defined by the bypass sections of the posts of two adjacent of the pairs, wherein the bypass channels have a width wider than the diameter of the micrometer scale objects to be captured. The array is configured such that the bypass sections impart a momentum on the micrometer scale objects that at least partially directs the micrometer scale objects towards the trapping channels.

Another aspect of this disclosure enables methods for capturing micrometer scale objects. The methods comprise directing a first fluid flow comprising the micrometer scale objects to be captured through the devices as described in this disclosure.

Another aspect of this disclosure enables methods of treating cancer. The methods comprise directing a flow comprising blood, tissue, or derivatives thereof from a patient into the devices as described in this disclosure such that one or more potential cancer cells are captured. The cells are classified as non-cancerous or cancerous, and the patient is treated if the cells are cancerous. The directing, classifying, and treating steps are repeated, such that treatment ends when cancerous cells are not identified.

Additional aspects, together with the advantages and novel features appurtenant thereto, will be set forth in part in the description which follows, and in part will become apparent to those skilled in the art upon examination of the following, or may be learned from the practice of aspects of this disclosure. The objects and advantages may be realized and attained by means of the instrumentalities and combinations particularly pointed out in the appended claims.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Certain additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

Like numbers (e.g. 100 and 300, 112 and 312, etc.) in the FIGS. refer to similar elements.

DETAILED DESCRIPTION OF CERTAIN EMBODIMENTS

Figure 1:
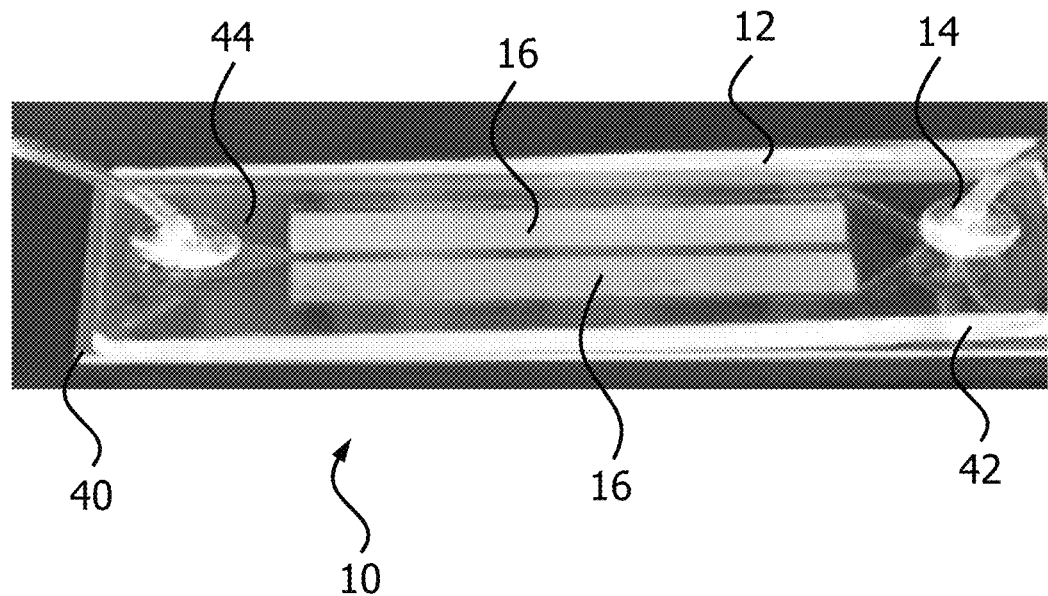
FIG. 1 is a perspective view of a device of one embodiment of the capture device.

The subject matter described herein relates to devices and methods for capturing micrometer scale objects from a fluid flow, and more particularly, to devices and methods for capturing cells. FIG. 1 generally illustrates one embodiment of capture device 10. Device 10 generally comprises a chamber 12 having an inlet 14 for receiving a fluid flow containing micrometer scale objects to be captured. An array of posts 16 is configured and arranged to selectively direct the micrometer scale objects toward trapping channels defined between posts 16 in which the micrometer scale objects can be trapped, and to direct smaller particles through bypass channels around the posts 16. In this manner, the devices described herein, as illustrated by the various exemplary embodiments, facilitate decreasing or eliminating clogging and flowrate issues encountered with other passive filtration or capture systems, while maintaining high capture efficiency. The capture devices 10 may be used in one or more applications, such as study of captured particles and cells, enrichment of cell solutions, diagnosis of diseases such as cancer, and treatment of diseases such as cancer.

Figure 2:
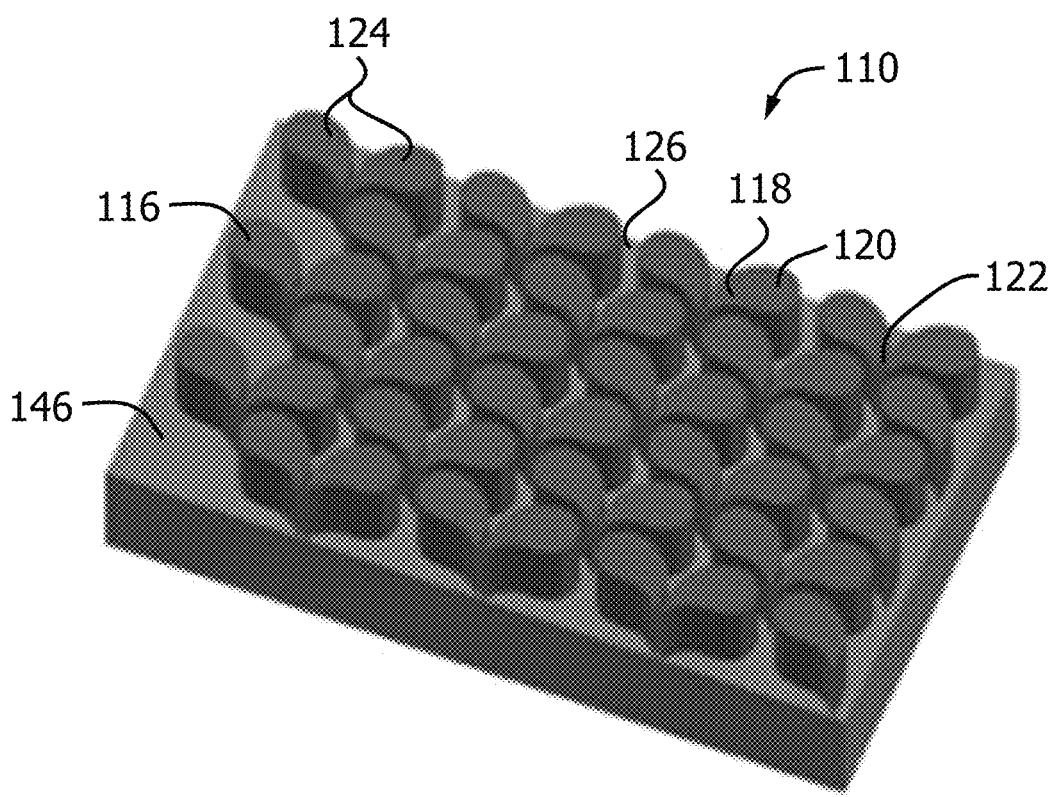
FIG. 2 depicts an array of posts of one embodiment of the invention.
Figure 3:
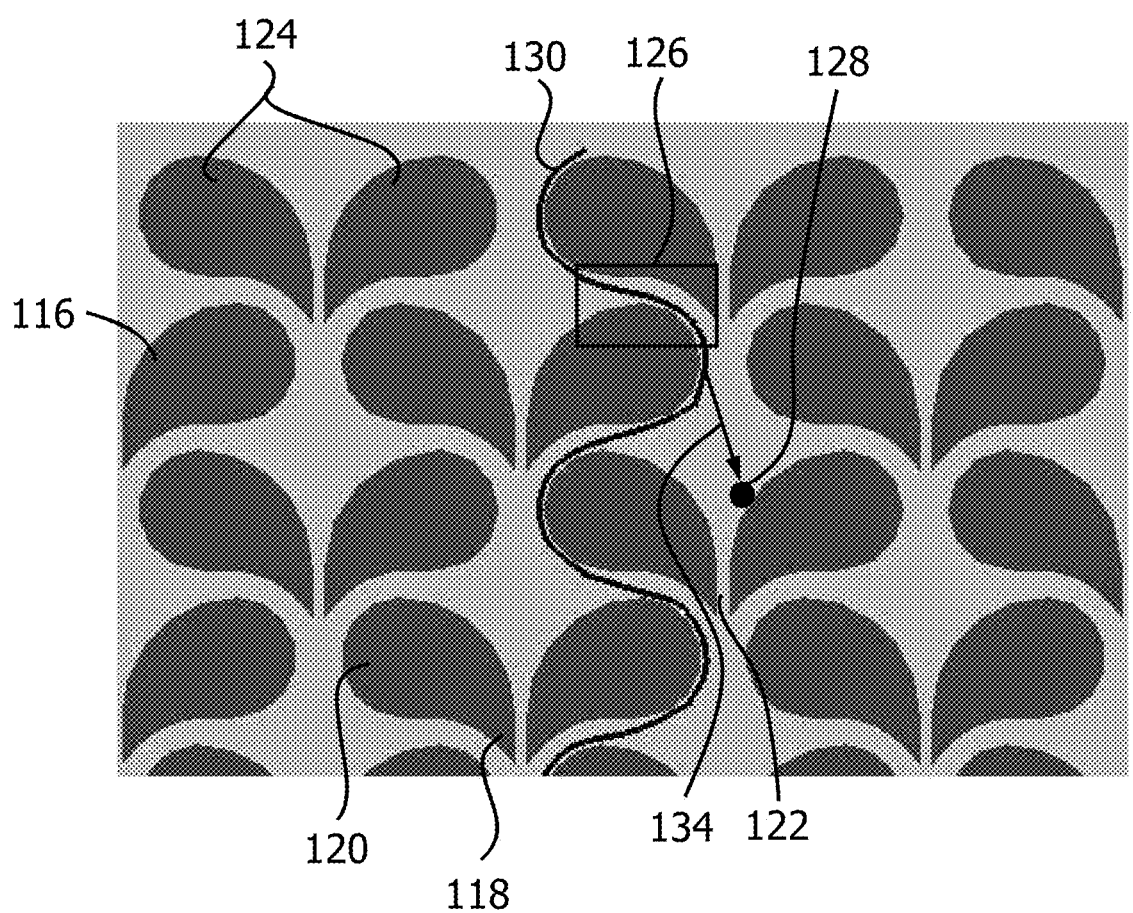
FIG. 3 depicts a plan view of the array of the embodiment of FIG. 1.

FIGS. 2 and 3 illustrate an array of posts 116 of one illustrative embodiment of device 110. Posts 116 comprise a trapping section 118 and bypass section 120. A plurality of trapping channels 122 are defined between the trapping sections 118 of posts 116. Posts 116 may be arranged as pairs 124, with trapping channels 122 defined by trapping sections 118 of the posts 116 comprising a pair 124. A plurality of bypass channels 126 are partially defined by bypass sections 120 of posts 116, which may be the posts 116 of two adjacent of the pairs 124. In certain embodiments, posts 116 comprising a pair 124 are mirror images of each other.

The fluid flow may flow through trapping channels 122 and bypass channels 126. Bypass channels 126 have a width wider than the diameter of the micrometer scale objects 128 to be captured, and trapping channels 122 have a width narrower than objects 128. Bypass sections 120 impart a momentum on the micrometer scale objects 128 that at least partially directs objects 128 into trapping channels 122, where objects 128 may be trapped.

Figure 4:
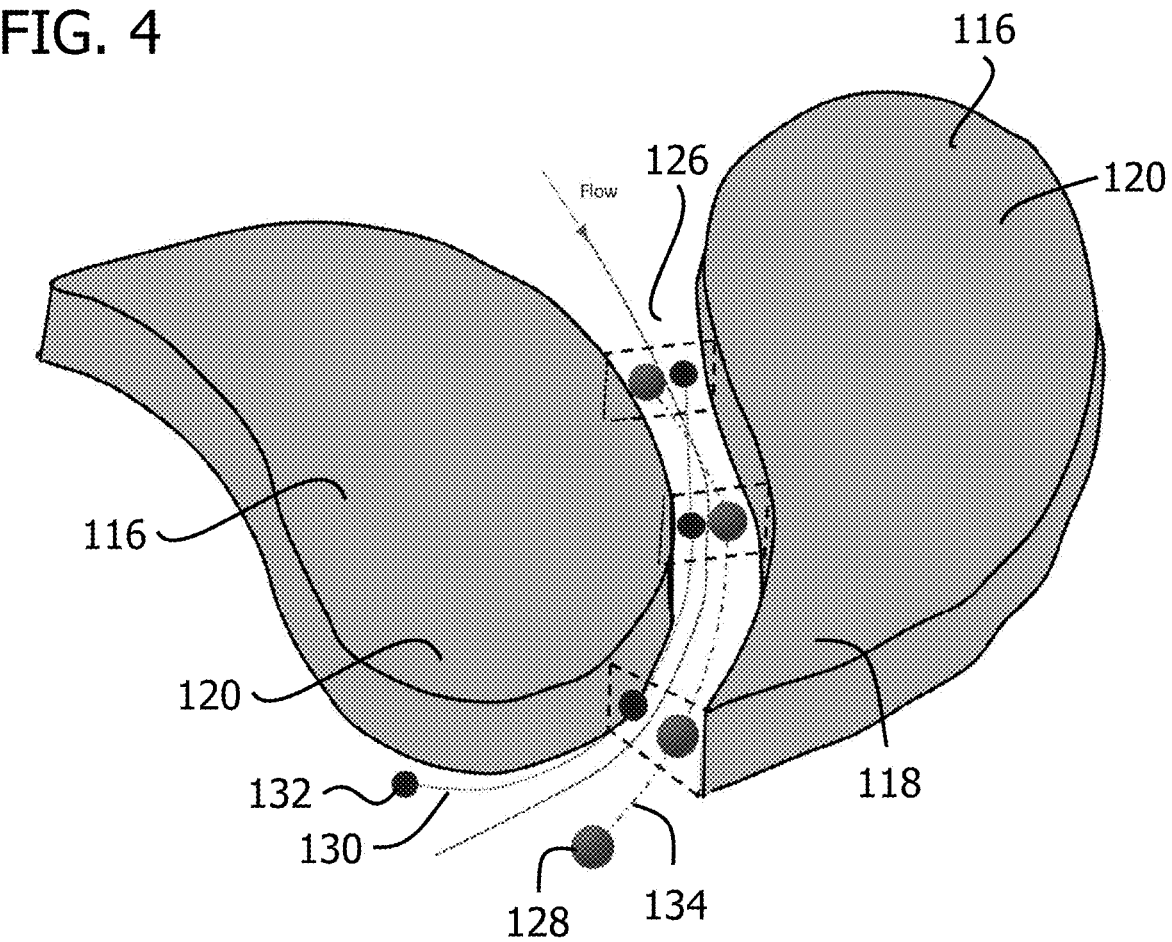
FIG. 4 depicts particle paths between two posts of the array of the embodiment of FIG. 1.

More specifically, FIGS. 3 and 4 show an exemplary main flow 130 by which smaller particles 132 pass through bypass channels 126, and an exemplary secondary object path 134, which directs objects 128 to a trapping channel 122, in which it may be captured, as shown in FIG. 3. The combination of trapping channels 122 and bypass channels 126 results in a bypassing arrangement which helps in avoiding the blockage of the bypass channels 126, and yields particle separation at different locations in the array, ensuring high throughput and high capturing efficiency.

Figure 5:
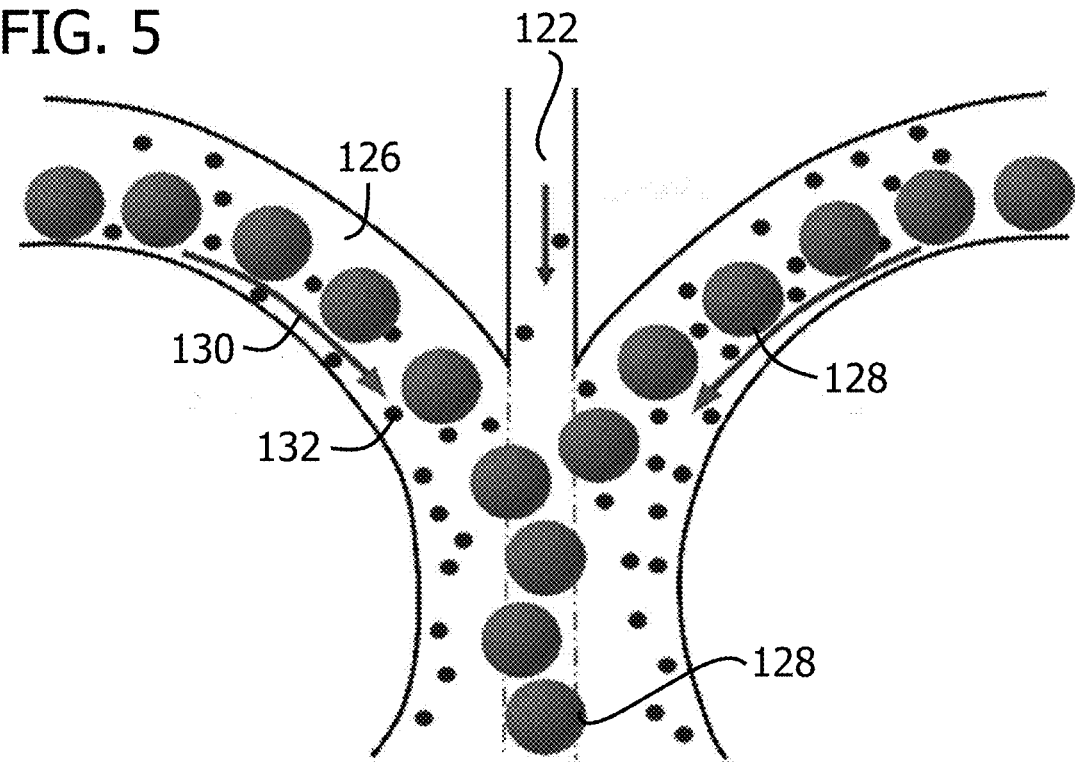
FIG. 5 depicts particle paths through a section of the array of the embodiment of FIG. 1.

As shown in FIG. 5, trapping channels 122 may produce a trapping flowrate through the trapping channel 122 and this trapping flowrate may at least partially contribute to directing micrometer scale objects 128 towards downstream trapping channels 122, as shown in FIG. 3. Additionally, when a micrometer scale object 128 obstructs one of the trapping channels 122, the trapping flowrate becomes lower, such that subsequent micrometer scale objects 128 are preferentially directed through bypass channels 126.

Trapping channels 122 have a width narrower than a diameter of micrometer scale objects 128 to be captured. In some embodiments, the trapping channels have a width from about 0.1 μm to about 100 μm, from about 1 μm to about 100 μm, from about 2 μm to about 100 μm, from about 1 μm to about 90 μm, from about 3 μm to about 70 μm, from about 4 μm to about 50 μm, from about 5 μm to about 10 μm, or any other value or range therebetween.

Bypass channels 126 have a width wider than the diameter of micrometer scale objects 128. In some embodiments, the bypass channels have a width from about 1 μm to about 1000 μm, from a 5 μm to about 500 μm, from about 5 μm to about 50 μm, from about 10 μm to about 30 μm, or any other value or range therebetween.

Posts 116 when use in arrays with trapping channels 122 and bypass channels 126 having the widths described in the previous paragraphs would have a height from about 5 μm to about 1000 μm, from about 10 μm to about 200 μm, from about 20 μm to about 50 μm, or any other value or range therebetween.

As discussed with respect to FIGS. 3 and 4, the array of posts 116 is configured such that bypass sections 120 impart a momentum on micrometer scale objects 128 towards trapping channels 122. Though not limited by any particular theory, it is believed the devices described herein operate using the inertial migration of particles flowing through a curved microchannel. In a curved microchannel (e.g. bypass channels 126), fluidic flow around the curvature (e.g. the bypass sections 120) forms helical streamlines which are considered to be a secondary flow (e.g. creating object path 134) moving away from the curvature. Though the intensity of the secondary flow is relatively small compared to the main flow through the device, the secondary flow can be utilized to separate larger particles (e.g. micrometer scale objects 128) from smaller particles (e.g. smaller particles 132) since the secondary flow depends on the radius of curvature of the curved path and the size of the particle.

FIGS. 3 and 4 also depict how the inertial migration of smaller particles 132 is utilized in some aspects to also direct the smaller particles 132. The array of posts 116 may be configured such that the bypass sections 120 impart a momentum on smaller particles 132, which are smaller than the micrometer scale objects 128, and the momentum at least partially directs smaller particles 132 away from trapping channels 122. As used herein, smaller particles 132 have a size sufficiently smaller than the micrometer scale objects 128 to be captured, such that the smaller particles 132 are not trapped by trapping channels 122.

Various shapes of posts 116 and configurations of arrays of posts 116 can be used consistent with the present invention. The intensity of the secondary flow that directs object path 134 can be analyzed using dean number, which is a dimensionless parameter that outlines the secondary flow characteristics in a curved channel and is given as follows $$D_e = R_e \cdot \sqrt{\frac{D_h}{R}}$$

The dean number (De) is a function of Reynolds number (Re), the hydraulic diameter for a rectangular channel (Dh) and the radius of curvature (R). The dean number increases when the Reynolds number increases and radius of curvature decreases which increases the intensity of secondary flow in the channel. The hydraulic diameter for a rectangular channel is given by $$D_h = \frac{2wh}{w+h}$$

which consists of w (width of the rectangular channel) and d (depth of the rectangular channel). Using this formula, various shapes, heights, and configuration of posts 116 can be developed to create secondary flows to direct objects of interest into trapping channels 122 between posts 116.

As shown in FIG. 4, in some aspects, bypass sections 120 are contoured more steeply than trapping sections 118. In this way posts 116 have a high enough dean number to have a strong secondary flow around posts 116. The movement of particles around the high aspect ratio (CR=d/w) bypass channel 126 can be explained by a rotation-induced lift force which results from the secondary flow. First the particles experience shear-induced lift force and move towards the sidewalls of posts 116, and then due to the rotation-induced lift force they are pushed away from the sidewalls of posts 116, where an equilibrium is achieved at a position along the steeply contoured bypass sections 120 of the bypass channels 126. At least in part due to the design of the posts 116, the rotation-induced lift force is predominant and the larger objects 128 experience more force and are directed away from the bypass sections 120 and towards the trapping channels 122. For a particle to be considered sufficiently large so as to experience this force, it has to have a diameter less than about 70% of the channel depth and any greater than about 30% of the channel depth. The desired channel depth, or post height, can therefore be determined based on the size of the object 128 to be captured.

Figure 6:
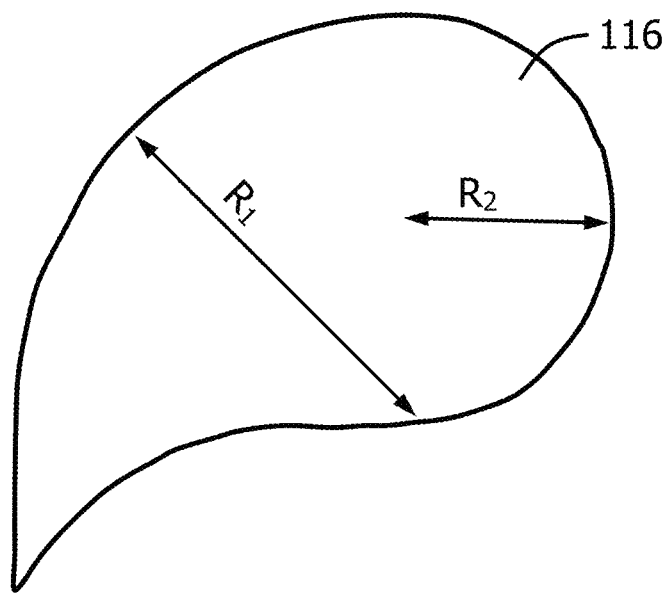
FIG. 6 depicts a post of the embodiment of FIG. 1.

Various embodiments of the capture device, consistent with these teachings, have been developed. In some aspects, such as in the embodiment of FIG. 6, posts 116 have a generally comma shape defined by a first partial circular shape with a first radius of curvature R1 and a second partial circular shape with a second radius of curvature R2, wherein the first radius of curvature R1 is about 1.5 to about 5 times greater than that of the second radius of curvature R2, and may be 1.5, 2, 2.5, 3, 3.5, 4, 4.5, or 5 times greater, or any other value or range therebetween. In certain embodiments, the first radius of curvature R1 may be about 60 to about 100 um and the second radius of curvature R2 may be about 20 to about 40 um.

Figure 7:
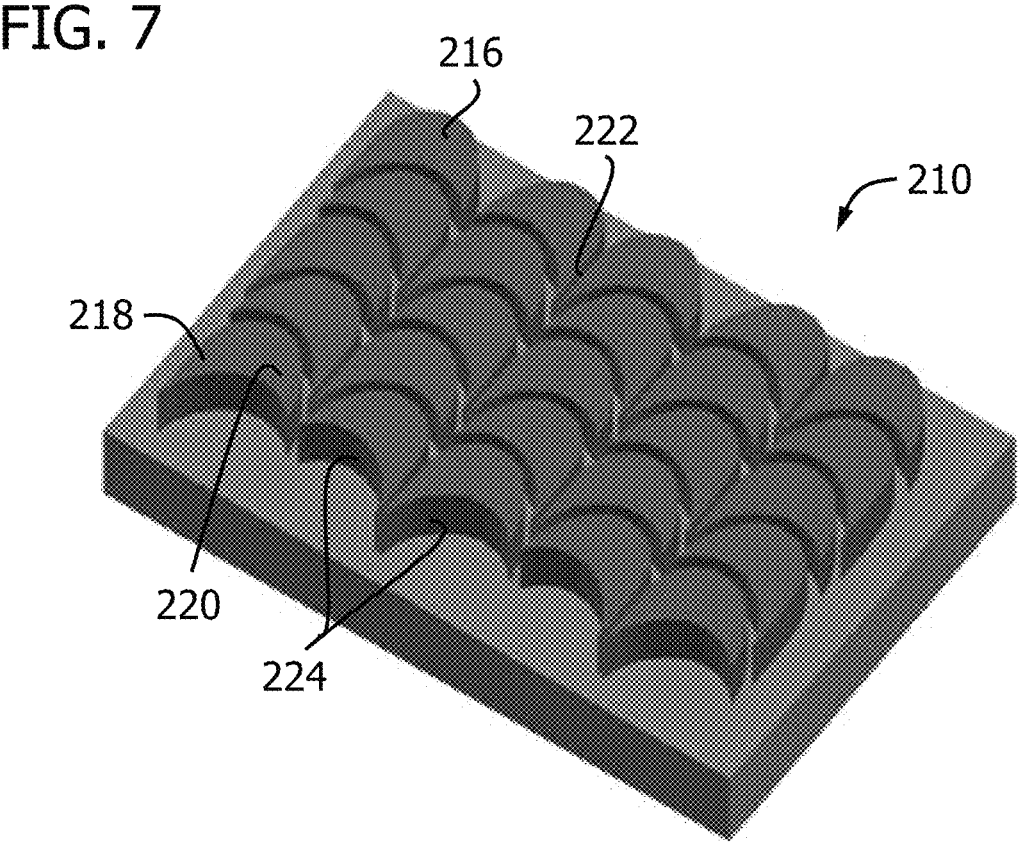
FIG. 7 depicts an array of posts of another embodiment of the capture device.

FIG. 7 shows a cutaway view of another embodiment of an array of posts 216 for use in capture device 210. Posts 216 in the array may be arranged in pairs 224, and posts 216 comprising a pair 224 may be mirror images of each other.

Figure 8:
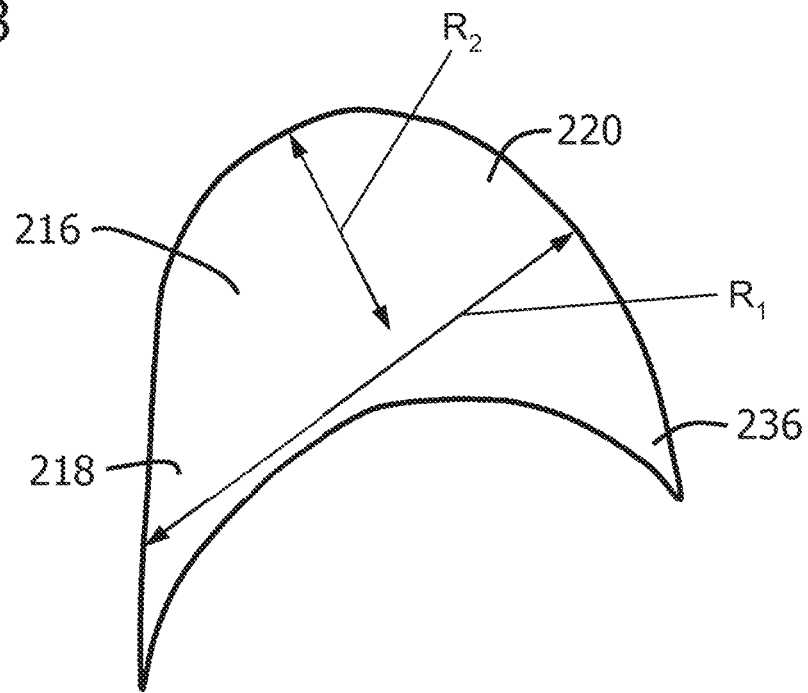
FIG. 8 depicts a post of the embodiment of FIG. 7.

As shown in FIG. 8, posts 216 may have a generally comma shape defined by a first partial circular shape with a first radius of curvature R1 and a second partial circular shape with a second radius of curvature R2, wherein the first radius of curvature R1 is about 1.5 to about 5 times greater than that of the second radius of curvature R2, and may be 1.5, 2, 2.5, 3, 3.5, 4, 4.5, or 5 times greater, or any other value or range therebetween. For example, the first radius of curvature R1 may be about 60 to about 100 um and the second radius of curvature R2 may be about 20 to about 40 um. In some aspects, the post 216 comprises an acute angle 236.

Figure 9:
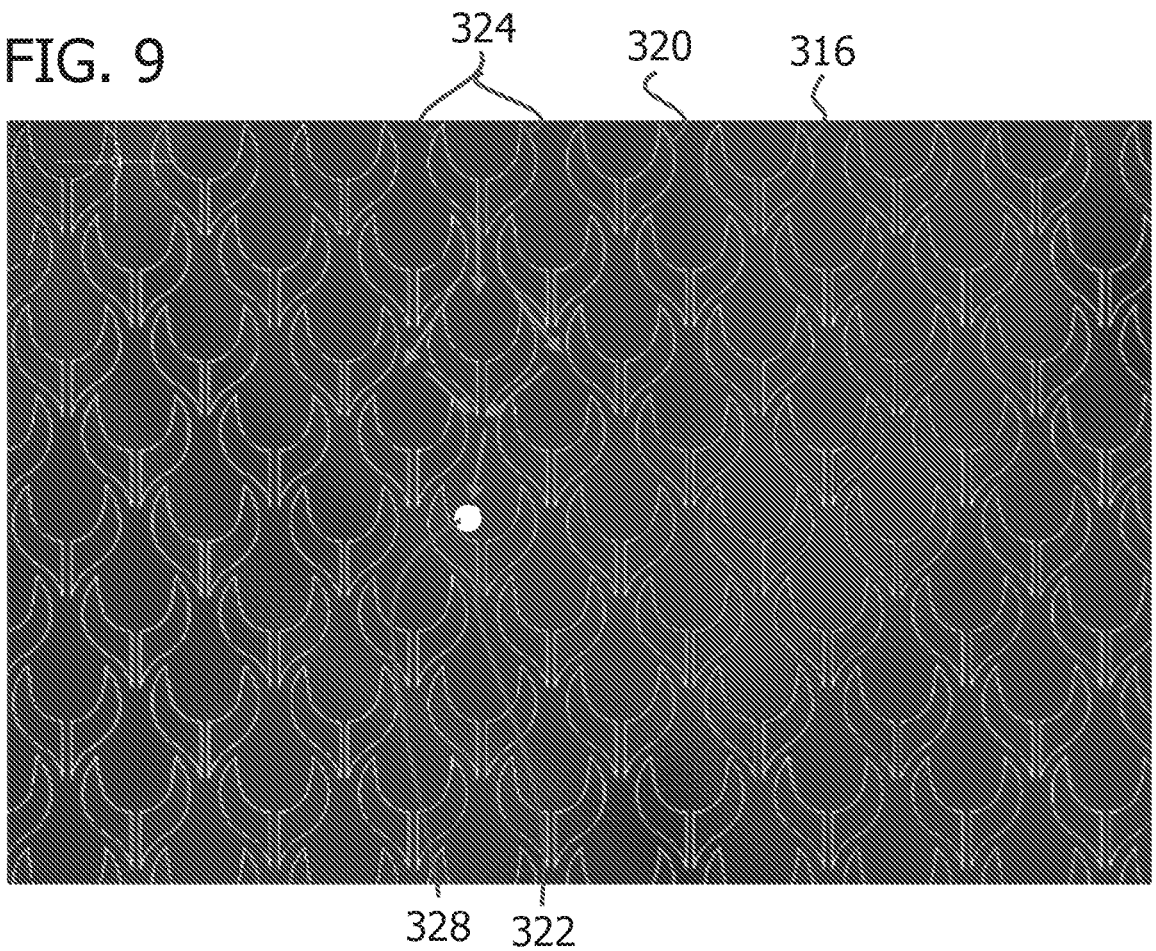
FIG. 9 depicts an array of posts of another embodiment of the capture device.

FIG. 9 illustrates yet another embodiment of an array of posts 316 for use in a capture device described herein. Posts 316 in the array may be arranged in pairs 324, and the posts 316 comprising a pair 324 may be mirror images of each other. A micrometer scale object to be captured 328 moving along the bypass section 320 of post 316 has the possibility to get trapped in the next consecutive post 316 along the flow by hitting an upper part the next consecutive post 316 and rolling down along the concave wall of post 316 into trapping channel 322. Cell elongation is not observed in this embodiment, since the forces are almost uniform near the trapping channel 322, improving retrieval of trapped cells.

Figure 10:
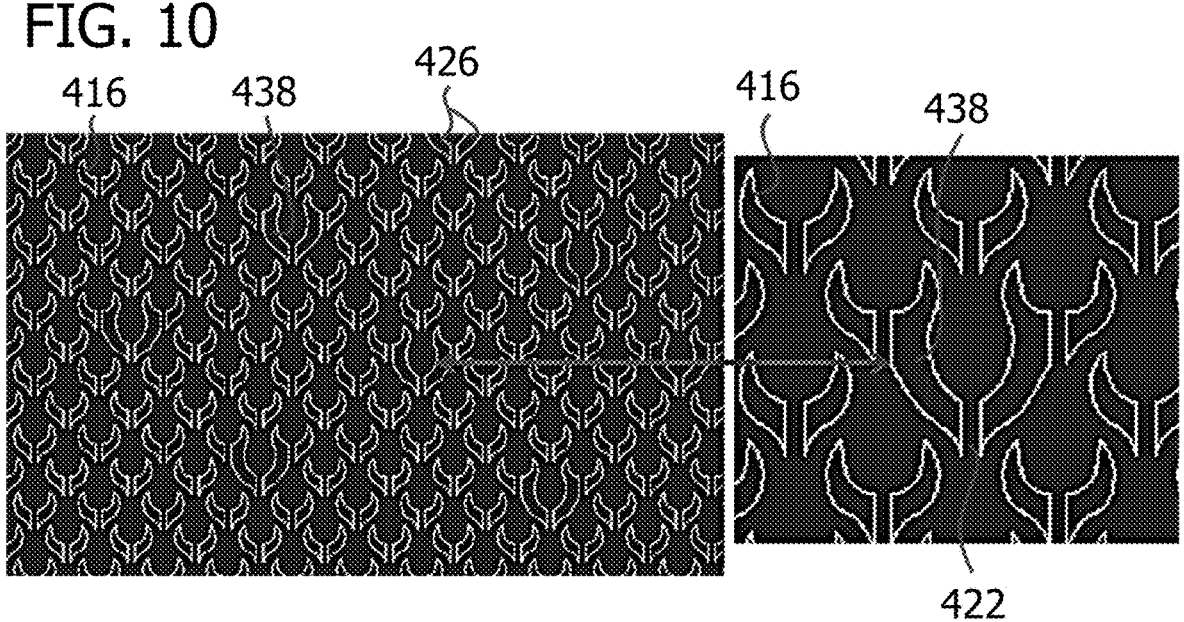
FIG. 10 depicts an array of posts of a variation of the embodiment of FIG. 9.

FIG. 10 illustrates another embodiment of an array of posts 416 for use in a capture device described herein. Posts 416 in the array may be arranged in pairs 424, and the posts 416 comprising a pair 424 may be mirror images of each other. A plurality of fused posts 438 may be included in the array. The fused posts 438 comprise two of the posts 416 joined together, with each post 416 forming fused post 438 located in adjacent pairs 424. Fused posts 438 may help divert the fluid flow to the trapping channel 422. Without these fused posts 418 the fluid flow would pass diagonally through the array. Fused posts 438 help create a zig-zag movement of the fluid flow through the array which enhances capture efficiency. The number of unfused posts 416 may be greater than or equal to the number of fused posts 438.

Figure 11:
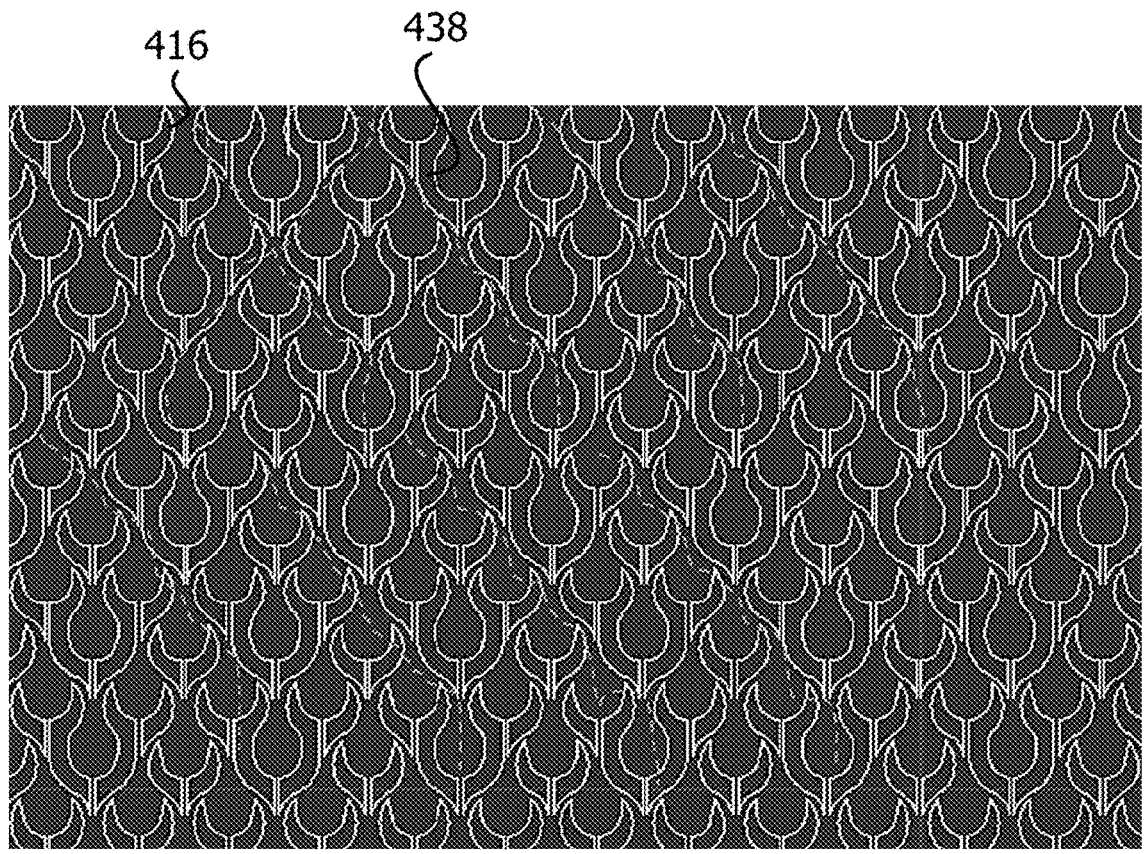
FIG. 11 depicts fluid flow through the array of posts of a second variation of the embodiment of FIG. 9.

FIG. 11 illustrates a variation of the array shown in FIG. 10 which comprises a greater percentage of fused posts 438 than in the array of FIG. 10, such that the number of fused posts 438 is about equal to the number of unfused posts 416.

Returning to FIG. 1, capture device 10 generally comprises a floor 40, a plurality of side walls 42 and top 44 defining chamber 12. As depicted in FIG. 2, base 146 from which posts 116 extend is the floor of chamber 12. However, it should be understood that the base 146 may be a bottom horizontal surface, one of the side walls 42, or even the top 44 of chamber 12. Devices of the present application can be made from any other suitable materials, as will be readily understood by those in the art. In certain embodiments, capture devices 10 are fabricated using standard soft-lithography techniques from silicone. In certain embodiments, at least one of the floor 40, a side 42 and the top 44 is transparent to allow viewing of the objects trapped in the device.

When posts are described as a mirror image, they may be exact mirror images, or may be approximate mirror images.

The dimension and ratios described in detail with respect to FIGS. 2-4 apply to other embodiments disclosed herein.

Certain aspects of the disclosure also relate to methods for capturing micrometer scale objects using the devices described herein. In one aspect, a method includes directing a fluid flow comprising an object to be captured through a capture device as described herein. The fluid flow is generally directed through the inlet of the device and passes through the bypass channels and trapping channels created by the posts of the device as discussed herein with respect to the various embodiments of the device. For example, the method of capturing micrometer scale objects comprises creating the main flow and secondary flow to direct the objects to be captured to the trapping channels, and the smaller particles to the bypass channels, as discussed herein with respect to the various embodiments of the device.

The fluid flow may have a flowrate through the device of about 0.1 mL/min to about 10 mL/min, about 0.1 mL/min to about 5 mL/min, about 1 mL/min to about 10 mL/min, about 1 mL/min to about 5 mL/min, or any other range or value therebetween. An advantage of the bypass channel design described herein is that these flowrates may be utilized without significant clogging or fouling of the device and with high capture efficiency. Flowrate selection depends on several factors, including the diameter of the object to be captured, the size and shape of the posts, and the size and shape of the bypass channels and of the trapping channels. In some aspects, a max flowrate through the device is defined as the flowrate above which the objects to be captured are not at least partially directed into the trapping channels, due to main flow through the bypass channels overcoming secondary flows and other forces directing the objects to be captured into the trapping channels. In some aspects, the first flowrate through the device is less than said max flowrate.

In some aspects, the fluid flow comprises blood or comprises derivatives from blood or tissue. For example, the fluid flow may comprise diluted human blood such as from a cancer patient.

The fluid flow may contain additional micrometer scale objects, particles, and/or cells that comprise smaller particles than the micrometer scale objects to be captured. Generally, the configuration of the device is such that these smaller particles pass through bypass channels of the capture device without interacting with the trapping channels and/or the smaller particles pass through the trapping channels without becoming captured in the trapping channels. For example, the fluid flow may comprise blood comprising red blood cells and other larger cells to be captured, where the size of the red blood cells is less than that of the larger cells to be captured, and the red blood cells pass through the device without being captured.

In some aspects, the micrometer scale objects to be captured are microparticles and/or cells. For example, the cells may be polymorphonuclear (PMN) cells and/or cancer cells. PMN cells are relatively large (25-300 μm diameter) cells with amorphous cytokeratin patterns and many different morphologies. The cells to be captured may be circulating tumor cells (CTCs) that have detached from a primary tumor and are found in the blood of cancer patients. In some aspects, the micrometer scale objects to be captured are PMN-CTCs. For example, PMN-CTCs may be from lung cancer, pancreatic cancer, and/or esophageal cancer. However, the methods and devices of the present invention can be used to separate any micrometer scale objects, that can be selectively captured to the exclusion of smaller particles by the devices and methods described herein.

In some aspects, the methods for capturing micrometer scale objects can further include releasing the micrometer scale objects from the trapping channels, and collecting the released objects. This may be achieved by reversing the fluid flow direction to create an opposite fluid flow through the device in a direction at least partially opposite from the direction of the first fluid flow, such that the micrometer scale objects previously captured from the first fluid flow are released into the opposite fluid flow. The opposite fluid flow can comprise any fluid suitable for the purpose, which may be a different fluid than that comprising the first fluid flow. For example, saline, in particular PBS, can be used as the opposite fluid flow. The opposite fluid flow pushes the captured micrometer scale objects out of the trapping channel, where the released microscale objects join the main flow of the opposite fluid flow. The released microscale objects in the opposite fluid flow are generally not trapped by the trapping channels as they travel in a direction opposite the first fluid flow because the portions of the posts at the trapping channel entrance as encountered by the opposite fluid flow, which in certain embodiments comprise sharp points, do not facilitate trapping. In this manner the micrometer scale objects may be collected from the opposite fluid flow, and further classified and/or used. In certain embodiments, the captured and released micrometer scale objects are cells, including any of the cells discussed herein. Released and collected cells may be used for any number of applications, including PCR sequencing. Cells collected through these methods may be viable, and may be suitable for cell culture.

Certain aspects of this disclosure also relate to a method for treating cancer. In some aspects, the method comprises directing a fluid flow comprising blood, tissue, or derivatives thereof from a patient into a capture device as described herein such that one or more potential cancer cells are captured. For example, the fluid flow may comprise diluted blood and the cells may be PMN-CTCs.

The method further comprises classifying the potential cancer cells as non-cancerous or cancerous. This may be accomplished by any known means. In some examples, the classifying step occurs when the cells are trapped within the device. For example, morphological features of the captured cells may be observed directly in the capture device. Also for example, the potential cancer cells may be subjected to immunofluorescence or other staining and imaged directly in the capture device. In certain embodiments, the device has a transparent top, side or bottom that allows the potential cancer cells to be viewed, distinguished and classified while in the device. In other embodiments, the potential cancel cells may be viewed, distinguished, separated and/or classified after release from the device as described above.

The method further comprises treating the patient if the cells are cancerous. Treatment may be accomplished by any known means. For example, a patient with cells identified as cancerous may be treated with radiation and/or chemotherapy. In some aspects, the method includes identifying a cancer subtype such as through morphological and/or biomarker features of the one or more potential cancer cells identified as cancerous in the classifying step, and treating the patient with a treatment regimen appropriate for the cancer subtype.

The method further comprises repeating the directing, classifying, and treating steps. In this manner the treatment regimen for a patient may be continued, halted, or changed as appropriate. For example, for a patient for which the potential cancer cells are identified as non-cancerous, the patient may not undergo treatment steps. For a patient with cells initially identified as cancerous and subjected to a treatment, subsequent rounds of classifying cells may identify a decrease in cancerous cell count, indicating the treatment regimen should continue. A stable or increasing cancerous cell count may indicate the treatment regimen should be substituted for a different treatment regimen. The absence of cancerous cells after a treatment regimen may indicate treatments should cease.

Certain aspects of the device and methods described herein are illustrated by the following non-limiting examples.

EXAMPLES

Example 1. Flow Velocity Simulations

Numerical analysis was done to check the optimal design and operating conditions of exemplary devices. COMSOL Multiphysics® 5.4 finite element software was used to simulate the velocity profile of exemplary devices. The operational conditions of the fluidic medium used were similar to those of water, with incompressible flow, an inlet linear velocity of 2 mm/sec, no slip boundary condition for all walls, and an outlet with zero pressure. Graphical representations of the velocity profiles for example devices were shown as thermal graphs, with high velocity areas shaded dark and low velocity areas shaded light.

Figure 12:
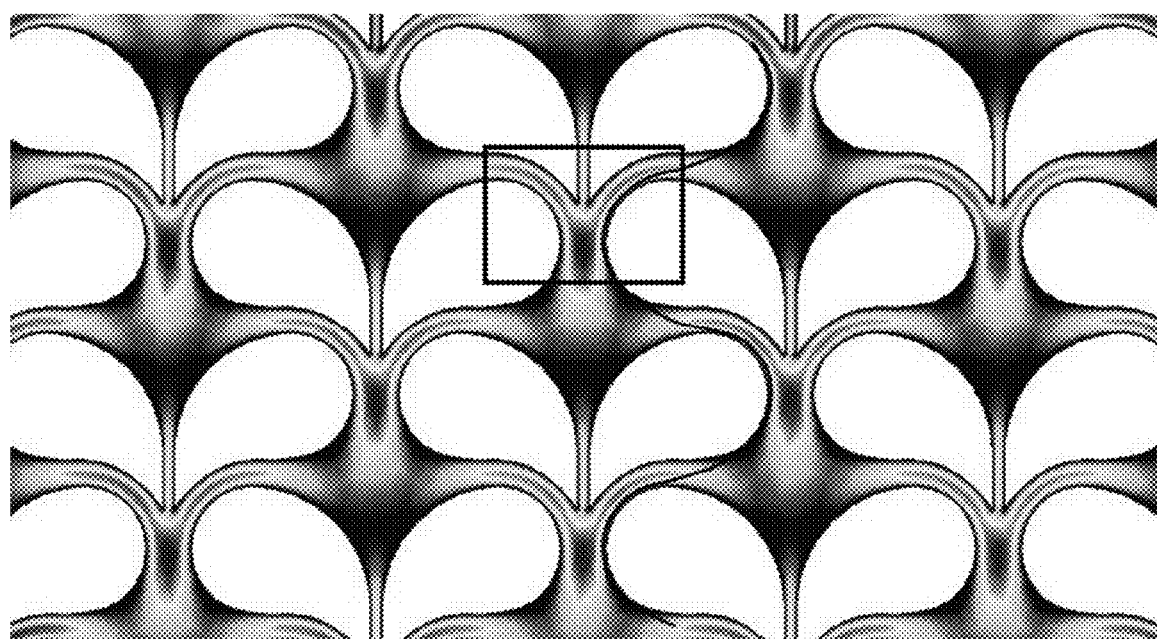
FIG. 12 shows simulated fluid flow rates of Example 1 through an array of the embodiment of FIG. 2.
Figure 13:
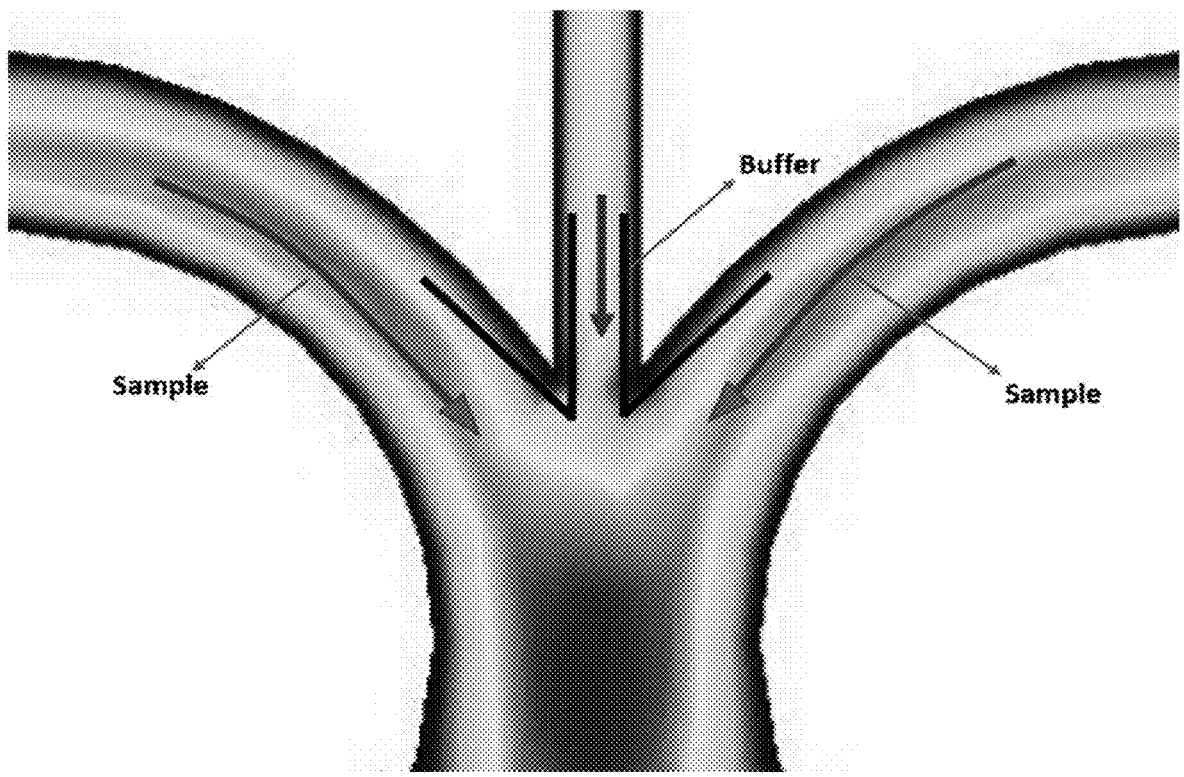
FIG. 13 shows an enlarged view of a section of FIG. 12.

FIG. 12 shows a velocity profile of an exemplary device of the embodiment of FIG. 2. High velocity was observed through the narrow trapping channel, which aids the laterally displaced object to be captured to pull towards the trapping channel. The post shape for the example device simulated in FIG. 12 was achieved by uniting two partial circles with radii of curvatures of 70 μm and 38 μm, to create an unbalanced flow pattern on both sides of the post. FIG. 13 shows an enlarged view of a section from FIG. 12. Velocity is lowest at the wall of the post due to the rotation-induced lift force, as described herein.

Figure 14:
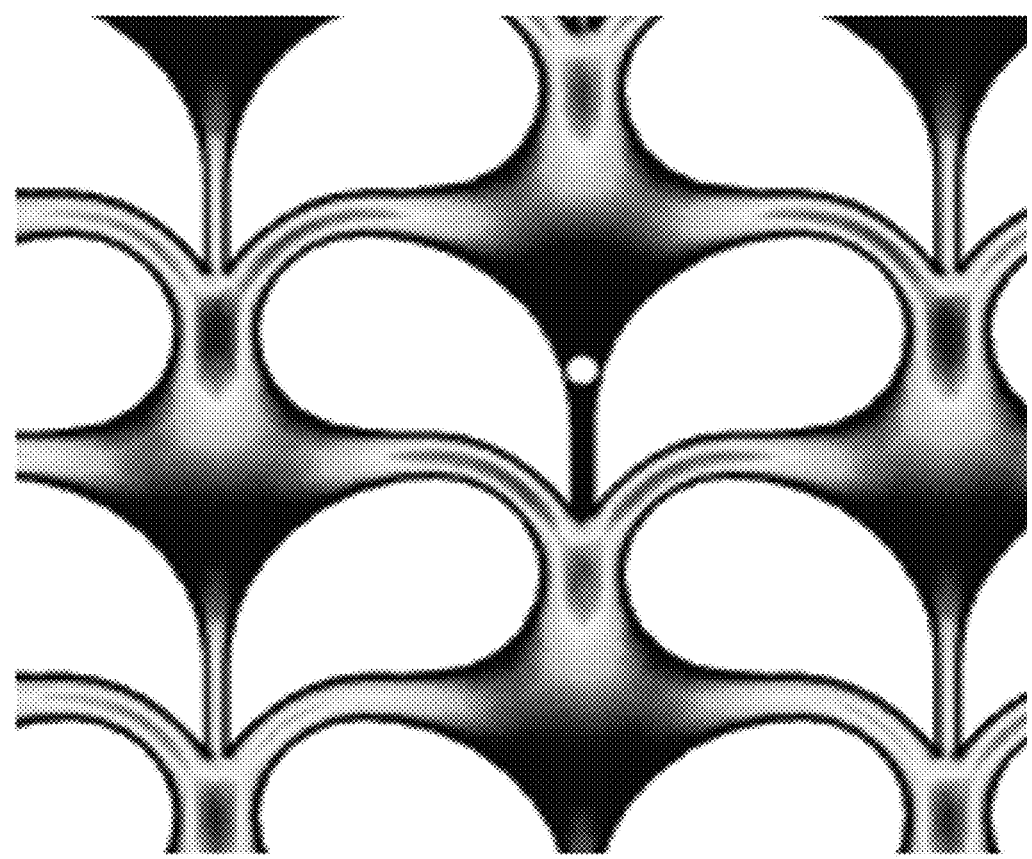
FIG. 14 shows simulated fluid flow rates of Example 1 through the array of the embodiment of FIG. 1 after capture of a micrometer scale object.

FIG. 14 shows a velocity profile of a different section from FIG. 12 after capture of a micrometer scale object. Velocity through the trapping channel drops, which aids the redirection of smaller particles back into the bypass channel for eventual redirection to other unoccupied trapping channels.

Figure 15:
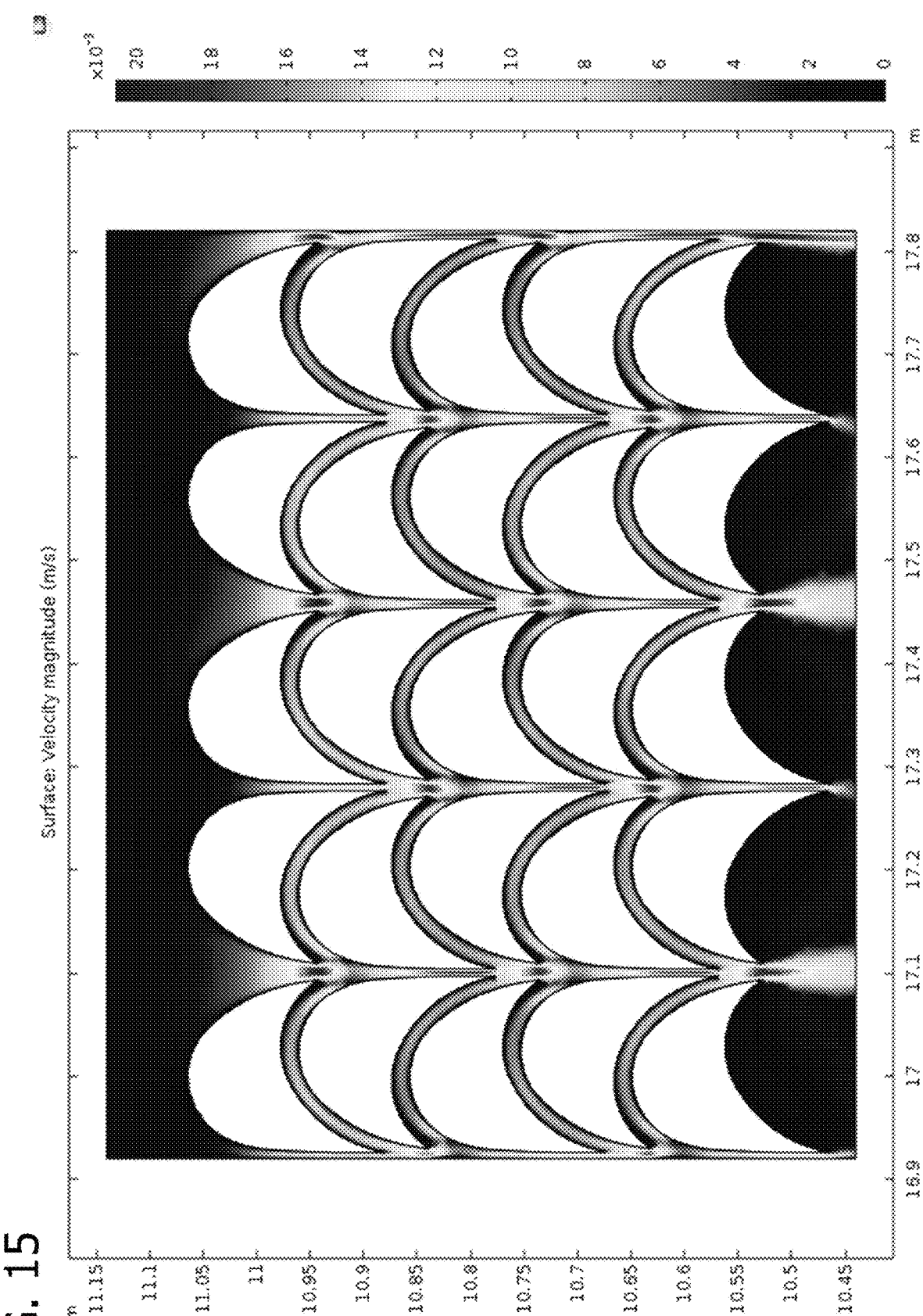
FIG. 15 shows simulated fluid flow rates of Example 1 through an array of the embodiment of FIG. 7.

FIG. 15 shows a velocity profile of an exemplary device of the embodiment of FIG. 7. The post design is elongated into a sharp structure for guiding of the object to be captured, so that the objects experience rotational-induced lift force for longer distances. After passage through the bypass channel, due to a sudden sharp turn in the post structure, more inertial forces act on the micrometer scale objects to be captured, guiding them away from the curved wall of the post and to the next trapping channel. The rotation-induced lift force aids in separating larger micrometer scale objects to be captured (e.g. circulating tumor cells) from the main flow and isolating them in the trapping channels.

Figure 16:
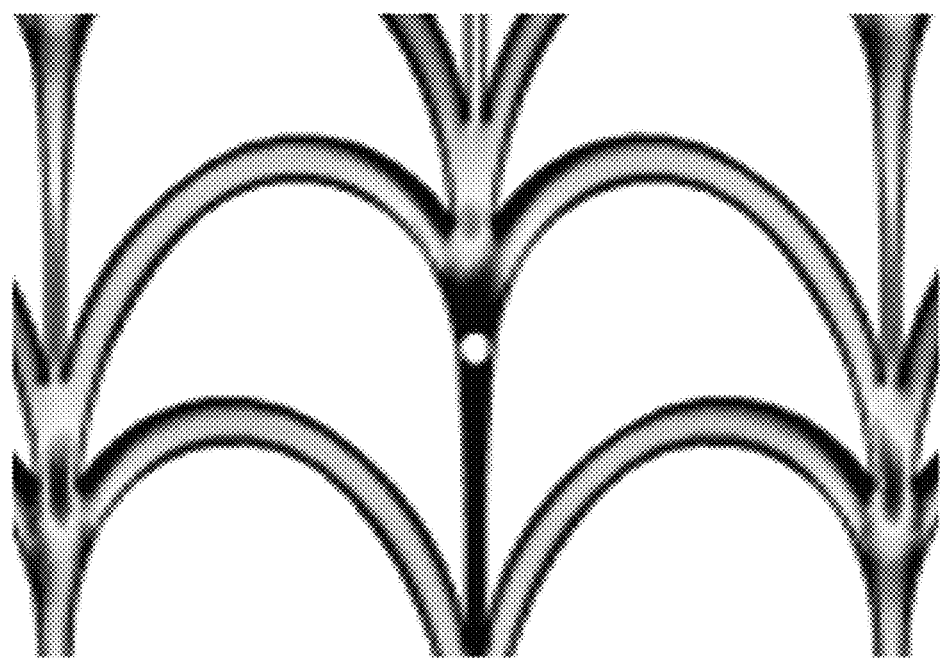
FIG. 16 shows simulated fluid flow rates of Example 1 through the array of the embodiment of FIG. 7 after capture of a micrometer scale object.

FIG. 16 shows a velocity profile of a section from FIG. 15 after capture of a micrometer scale object. Velocity through the trapping channel drops, which aids the redirection of smaller particles and uncaptured larger objects back into the bypass channel for eventual redirection of the object to be captured to other unoccupied trapping channels.

Example 2. Capture Device Fabrication

Example capture devices were fabricated using standard soft-lithography techniques. A silicone master mold bearing the inverse of the post and array pattern was prepared using standard photolithography methods employing a negative photoresist (SU 8 3025, Micro Chem®) on a silicon substrate. Sylgard™ 184 elastomer and polydimethylsiloxane (PDMS) curing agent were mixed in the required ratio and degassed to remove air pockets, then poured on the silicon master in a petri dish and cured at 75° C. for 3 hours. The PDMS substrate, comprising both a PDMS surface and PDMS posts projecting from the surface, was cut to size and removed from the silicone mold. The side of the substrate with the posts and also a clean glass slide (1" by 3") were treated with oxygen plasma at 70 W for 50 seconds and then bonded together without air gaps. In some examples, the bonded device was put on a hot plate at 80° C. for 15 min for stronger adhesion when necessary. Inlet and outlet ports were made by punching holes in the PDMS substrate and bonding tubes to the device.

Figure 17:
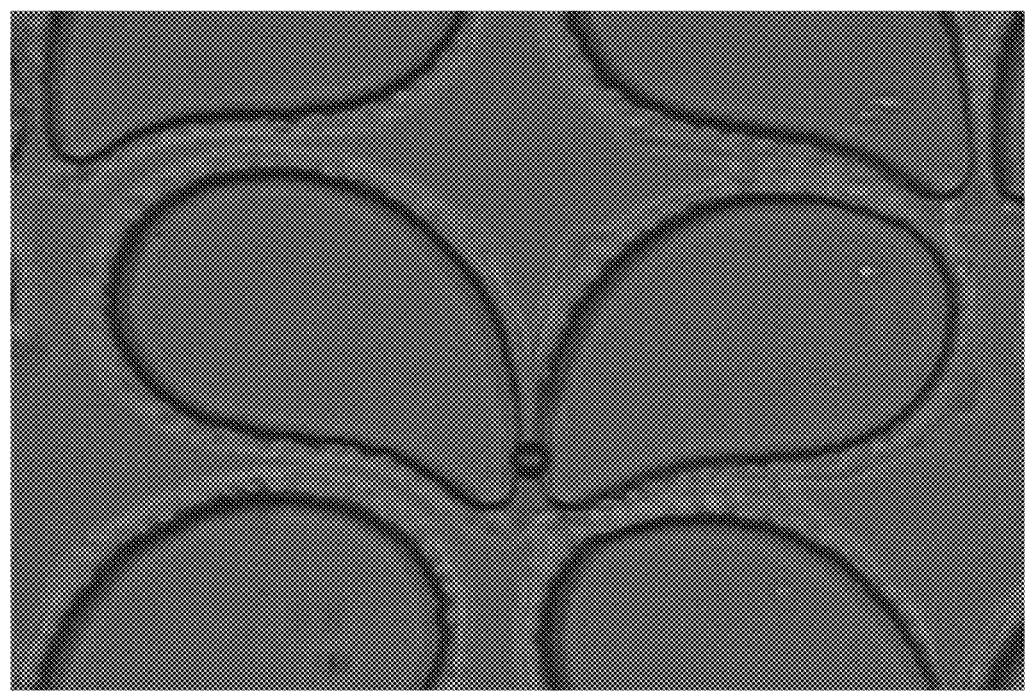
FIG. 17 shows a photograph of an array of posts of Example 2 of the embodiment of FIG. 2 with a captured microparticle.

An example capture device with a post array of the embodiment of FIG. 2 was fabricated incorporating 61,347 individual posts contained in an area of 675 mm2. These 61,347 posts were distributed in 507 rows, each containing 121 columns. This multiple layered array of posts ensured redundancy for particle isolation. The length of each post was about 80 μm and the height was about 30 μm. Trapping channels between pairs of posts which were mirror images of each other were created by a leaving an about 7 μm in width gap at a point between the posts in the pair. Bypass channels between posts were created by leaving an about 14 μm in width gap at a point between posts not in a pair. As particles traveled around curved walls of the posts and underwent radial displacement, the fluid flow coming out of an upper trapping channel aided to drive the particles towards the next consecutive trapping channel. When a particle was trapped in a trapping channel, the streamlines were diverted and the particle was detoured through a bypass channel (via carry forward) to the next level of the trapping array. As the device comprised hundreds of such trapping channels and bypass channels, capturing efficiency was aided by redundancy. The bypassing arrangement helped in avoiding blockage of the channels and yielded particle capture at different levels of the array, ensuring high throughput and high capturing efficiency. A 40× zoom image of the post array of the device was captured. FIG. 17 shows a representation of a pair of posts with a captured microparticle.

Figure 18:
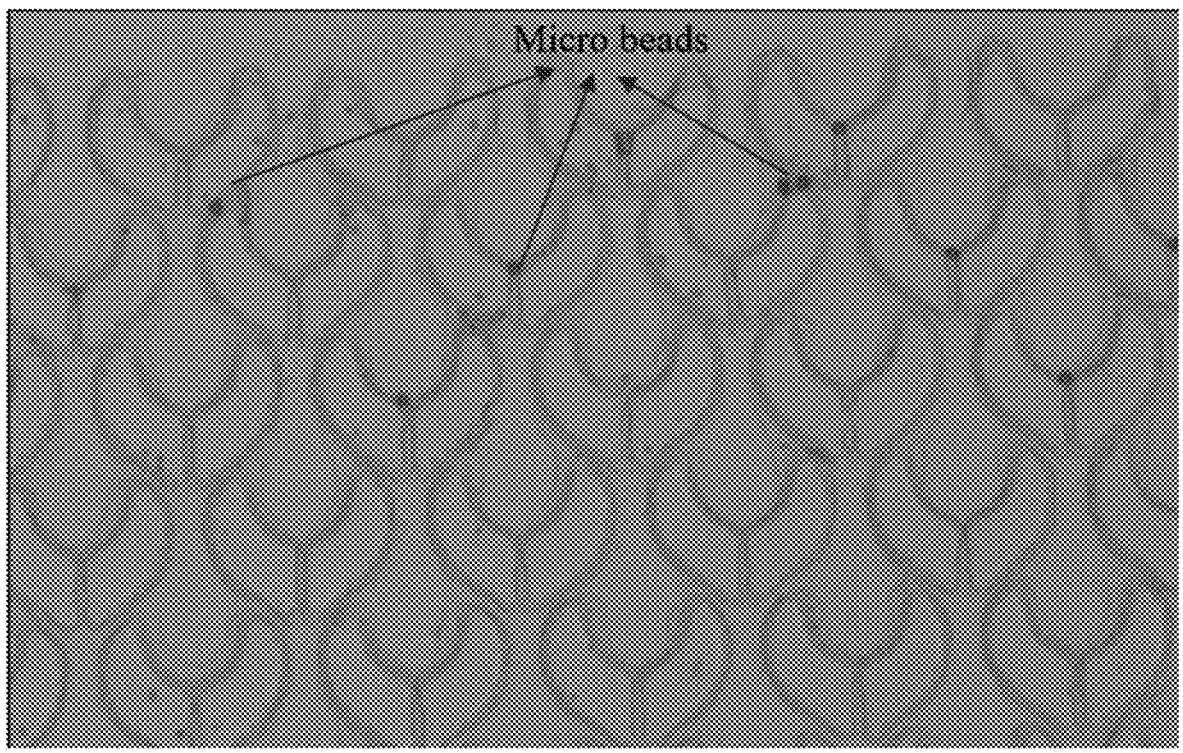
FIG. 18 shows a photograph of an array of posts of Example 2 of the embodiment of FIG. 9 with captured microparticles.

An example capture device with a post array of the embodiment FIG. 9 was similarly prepared. A 20× zoom image of the post array of the device was captured. FIG. 18 shows a representation of an array with captured microparticles.

Example 3. Capture Efficiency of Beads

Figure 19:
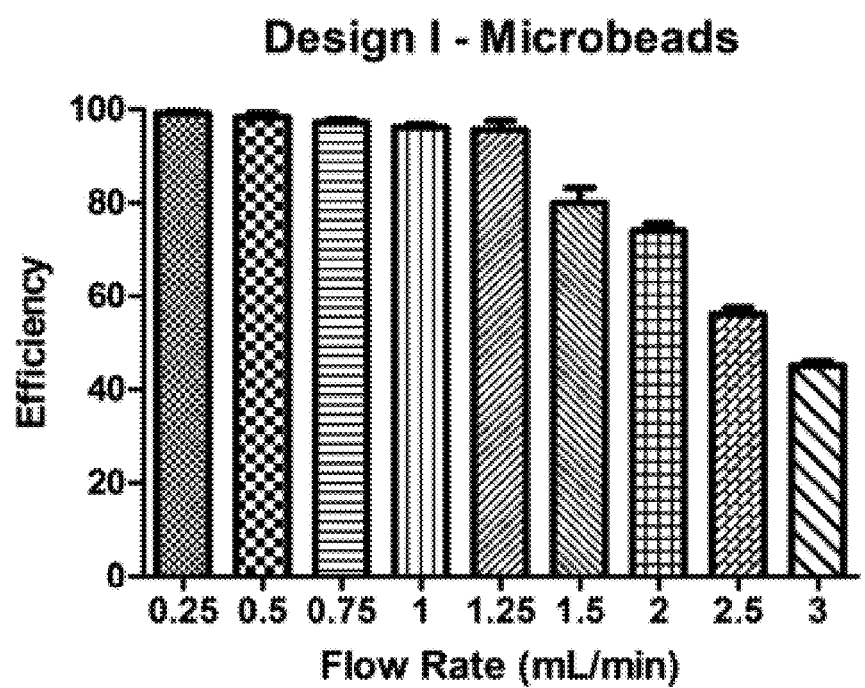
FIG. 19 shows results of Example 3, measuring the capture efficiency of an array of the embodiment of FIG. 2
Figure 20:
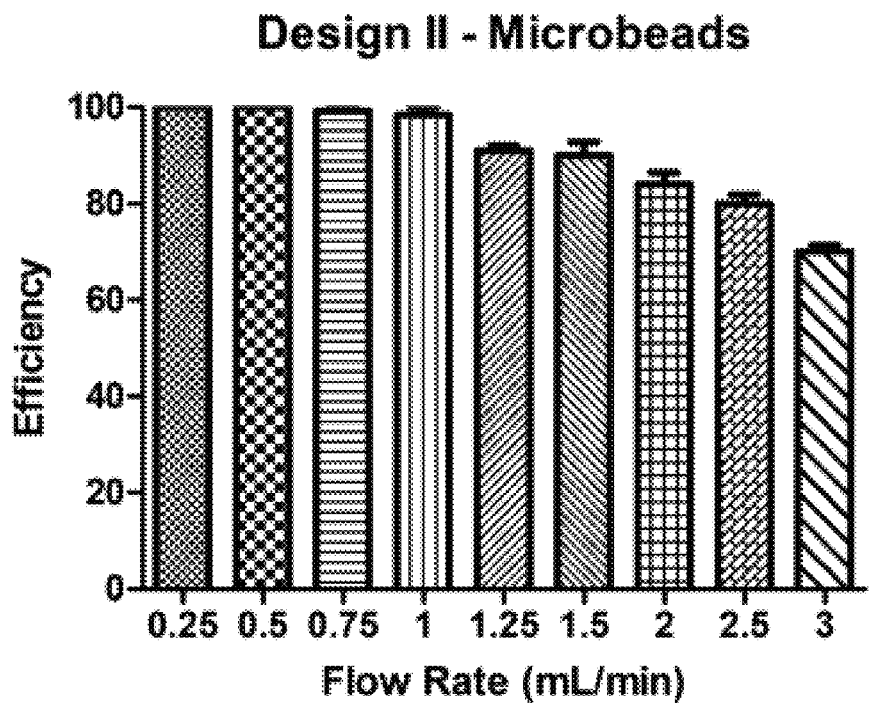
FIG. 20 shows the results of Example 3, measuring the capture efficiency of an array of the embodiment of FIG. 7

Exemplary devices were tested to evaluate their capture efficiency. Capture efficiency is the capability of capturing a percentage of the microparticles in each given sample. Microbeads of 7 μm diameter were used as standard tools for characterizing the capture device operation and performance under different conditions. A known amount of microbeads was suspended in phosphate buffered saline (PBS) and introduced through tube inlets into the device. Capture efficiency was calculated by comparing the number of beads trapped in the device with the known amount of beads, and was measured for different flow rates through the device from 0.25 mL/min to 3 mL/min. FIG. 19 shows the bead capture efficiency of a device of the embodiment shown in FIG. 2. FIG. 20 shows the bead capture efficiency of a device of the embodiment shown in FIG. 7. In both devices, capture efficiency remained above 90% at 1 mL/min, while the capture efficiency of the device of the embodiment of FIG. 7 remained above 70% even at flow rates of 3 mL/min.

Example 4. Capture Efficiency of Cells

Figure 21:
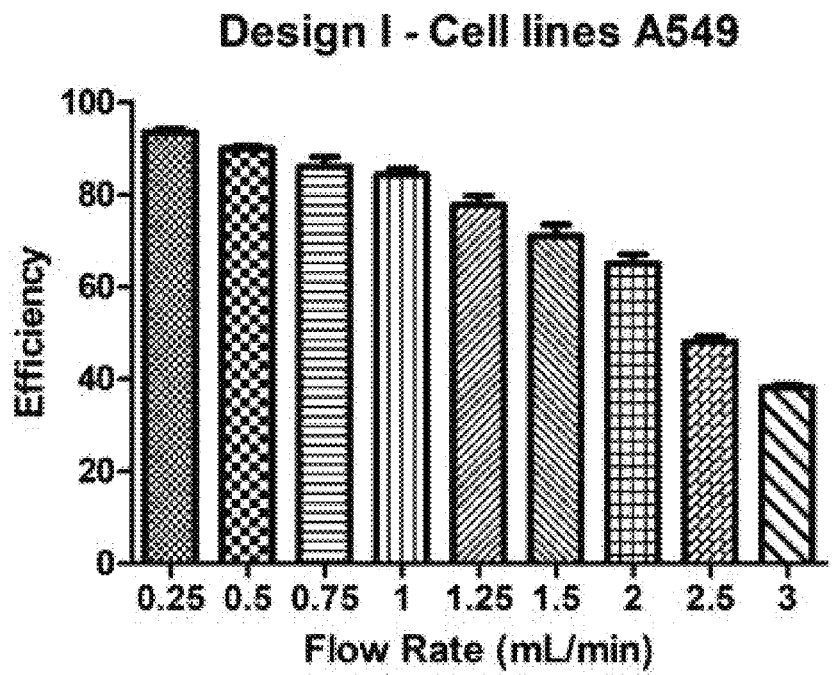
FIG. 21 shows the results of Example 4, measuring the capture efficiency of an array of the embodiment of FIG. 2.
Figure 22:
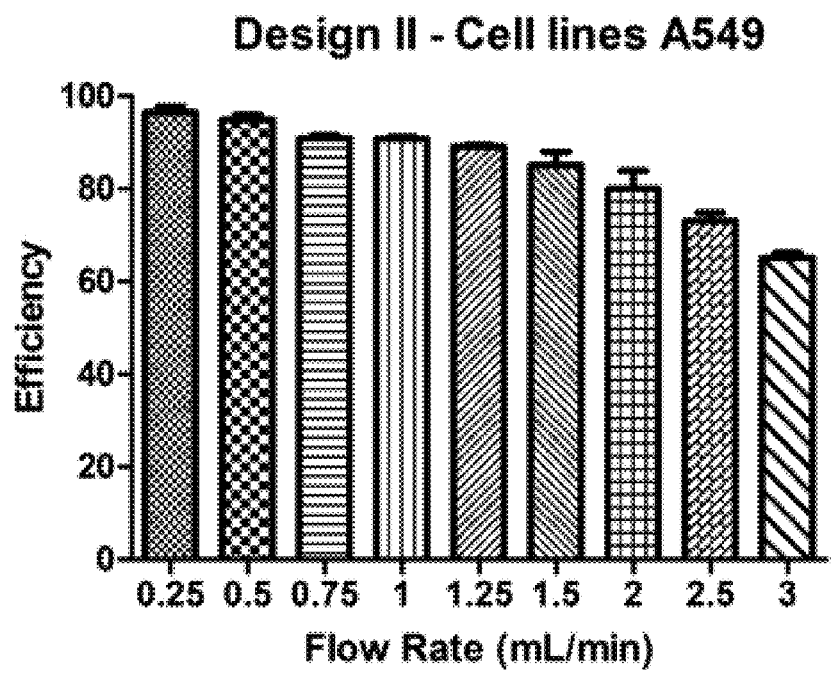
FIG. 22 shows the results of Example 4, measuring the capture efficiency of an array of the embodiment of FIG. 7.

Capture efficiency of cells was similarly evaluated with A549 cells, a human lung cancer cell line. Cells were introduced into the device at 100 cells/mL in buffer. Capture efficiency was calculated by comparing the number of cells trapped in the device with the known amount of cells, and was measured for different flow rates through the device from 0.25 mL/min to 3 mL/min. FIG. 21 shows the cell capture efficiency of a device like that shown in the embodiment of FIG. 2. FIG. 22 shows the cell capture efficiency of a device of the embodiment of FIG. 7. In both devices, capture efficiency remained above 80% at 1 mL/min, while the capture efficiency of the device of the embodiment of FIG. 7 remained above 70% even at flow rates of 3 mL/min.

Example 5. Capture Efficiency from Blood

Figure 23:
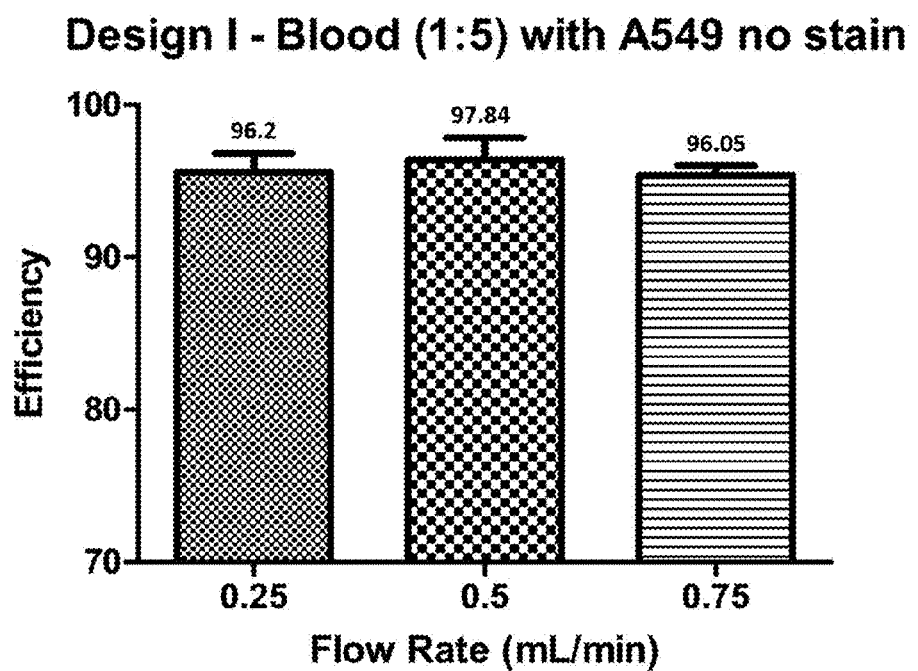
FIG. 23 shows the results of Example 5

Capture efficiency of cancer cells from human blood was also evaluated. Healthy human blood was spiked with a known quantity of A549 cells. Red blood cells in the sample were high in numbers (4.0-5.5×106/mL) but small in size (6.2-8.2 µm). The blood samples with the added A549 cells were diluted 1:5 with PBS to reduce viscosity and introduced into the device at flow rates between 0.25 mL/min to 0.75 mL/min. Captured A549 cells were counted manually with a microscope through the clear glass slide comprising part of the capture device chamber. Red blood cells passed through the device without clogging trapping channels. FIG. 23 shows that the capture efficiency for a device of the embodiment of FIG. 2 was over 90% for all tested flowrates.

Figure 24:
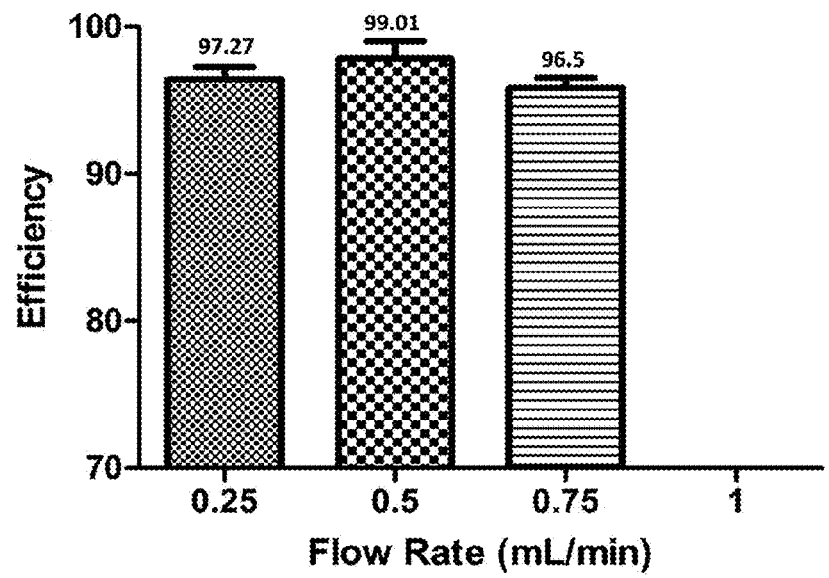
FIG. 24 shows additional results of Example 5.

An advantage of the devices described herein is that they permit methods for marking or staining of particles and cells using any known techniques. Captured cells may then be observed for the mark or stain. For example, human blood sample spiked with A549 cells was treated with the nuclear stain DAPI. The A549 cells were captured using the device of the embodiment of FIG. 2 as before, and A549 cells with the nuclear stain were counted using standard fluorescence filter sets with a microscope. FIG. 24 shows that the capture efficiency of A549 DAPI stained cells for a device of the embodiment of FIG. 2 was over 90% for all tested flowrates.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While specific embodiments have been shown and discussed, various modifications may of course be made, and the disclosure is not limited to the specific forms or arrangement of parts and steps described herein. While aspects of the disclosure have been described in terms of various examples with their associated operations, a person skilled in the art would appreciate that a combination of operations from any number of different examples is also within the scope of the aspects of the disclosure.

What is claimed and desired to be secured by Letters Patent is as follows:

1. A device for capturing micrometer scale objects, said device comprising:
   a chamber comprising an inlet for receiving a fluid flow, wherein the fluid flow comprises one or more micrometer scale objects to be captured and one or more micrometer scale objects that are smaller than the micrometer scale objects to be captured;
   a plurality of posts extending from a base of the chamber and arranged in an array of a plurality of pairs of the posts, wherein each post comprises an arcuate trapping section and an arcuate bypass section;
   a plurality of trapping channels, wherein each trapping channel is defined between the arcuate trapping sections of the posts in each pair of posts, wherein each trapping channel has a width narrower than a diameter of the one or more micrometer scale objects to be captured; and
   a plurality of bypass channels, wherein each bypass channel is partially defined by the arcuate bypass sections of adjacent posts in the array of posts, wherein each bypass channel has a width wider than the diameter of the one or more micrometer scale objects to be captured;
   wherein the array is configured such that when the inlet receives the fluid flow, the fluid flow passes through the bypass channels whereby a curved shape of the bypass channels between the arcuate bypass sections of adjacent posts imparts a first momentum on the one or more micrometer scale objects to be captured and a second momentum on the one or more micrometer scale objects that are smaller than the micrometer scale objects to be captured, whereby the one or more micrometer scale object to be captured are separated from the one or more micrometer scale objects that are smaller than the micrometer scale objects to be captured such that the first momentum directs the one or more micrometer scale objects to be captured into the trapping channels and
   the second momentum directs the secondary objects away from the trapping channels, whereby at least one of the one or more of the micrometer scale objects to be captured is trapped within the trapping channels formed between the trapping sections of the pairs of posts.

2. The device of claim 1, wherein when the at least one of the one or more micrometer scale objects to be captured is trapped within a trapping channel, the one or more micrometer scale objects to be captured obstructs the respective trapping channel, whereby the trapping flowrate becomes lower, such that a subsequent others of the one or more of the micrometer scale objects to be captured is directed through the bypass channels.

3. The device of claim 1, wherein each bypass section is curved more steeply than each trapping section.

4. The device of claim 1, wherein each post comprises a shape defined by a first partial circular shape with a first radius of curvature and a second partial circular shape with a second radius of curvature, wherein the first radius of curvature is about 1.5 to about 5 times greater than that of the second radius of curvature.

5. The device of claim 4, wherein the first radius of curvature is about 60 to about 100 urn and the second radius of curvature is about 20 to about 40 um.

6. The device of claim 5, wherein the shape of each post comprises an acute angle.

7. The device of claim 1 further comprising one or more fused posts, wherein each of the one or more fused posts is formed by joining one post to another post, wherein a number of fused posts is equal to or less than a number of non-fused posts.

8. The device of claim 1, wherein the posts in each pair of posts are mirror images of each other.

9. A method for capturing micrometer scale objects, the method comprising directing a fluid flow comprising one or more micrometer scale objects to be captured and one or more micrometer scale objects that are smaller than the micrometer scale objects to be captured through a device for capturing micrometer scale objects, wherein the device comprises:
 a chamber comprising an inlet for receiving a fluid flow, wherein the fluid flow comprises one or more micrometer scale objects to be captured and one or more micrometer scale objects that are smaller than the micrometer scale objects to be captured;
 a plurality of posts extending from a base of the chamber and arranged in an array of a plurality of pairs of the posts, wherein each post comprises an arcuate trapping section and an arcuate bypass section;
 a plurality of trapping channels, wherein each trapping channel is defined between the arcuate trapping sections of the posts in each pair of posts, wherein each trapping channel has a width narrower than a diameter of the one or more micrometer scale objects to be captured;
 a plurality of bypass channels, wherein each bypass channel is partially defined by the arcuate bypass sections of adjacent posts in the array of posts, wherein each bypass channel has a width wider than the diameter of the one or more micrometer scale objects to be captured;
 wherein the array is configured such that when the inlet receives the fluid flow, the fluid flow passes through the bypass channels whereby a curved shape of the bypass channels between the arcuate bypass sections of adjacent posts imparts a first momentum on the one or more micrometer scale objects to be captured and a second momentum on the one or more micrometer scale objects that are smaller than the micrometer scale objects to be captured, whereby the one or more micrometer scale object to be captured are separated from the one or more micrometer scale objects that are smaller than the micrometer scale objects to be captured such that the first momentum directs the one or more micrometer scale objects to be captured into the trapping channels and directs the secondary objects away from the trapping channels, whereby at least one of the one or more of the micrometer scale objects to be captured is trapped within the trapping channels formed between the trapping sections of the pairs of posts.

10. The method of claim 9, wherein the method further includes reversing the fluid flow direction to create an opposite fluid flow, wherein the micrometer scale objects previously captured in the device are released into the opposite fluid flow.

11. The method of claim 9, wherein the first fluid flow has a first flowrate through the device of about 0.1 mL/min to about 10 mL/min.

12. The method of claim 9, wherein the first flowrate through the device is less than a max flowrate through the device, wherein the max flowrate is defined as the flowrate above which the objects to be captured are not at least partially directed into the trapping channels.

13. The method of claim 9, wherein the first fluid flow comprises blood or comprises derivatives from blood and/or tissue.

14. The method of claim 9, wherein the micrometer scale objects are cells.

15. The method of claim 14, wherein the cells are cancer cells and/or are polymorphonuclear cells.

\* \* \* \* \*